Figure 1:
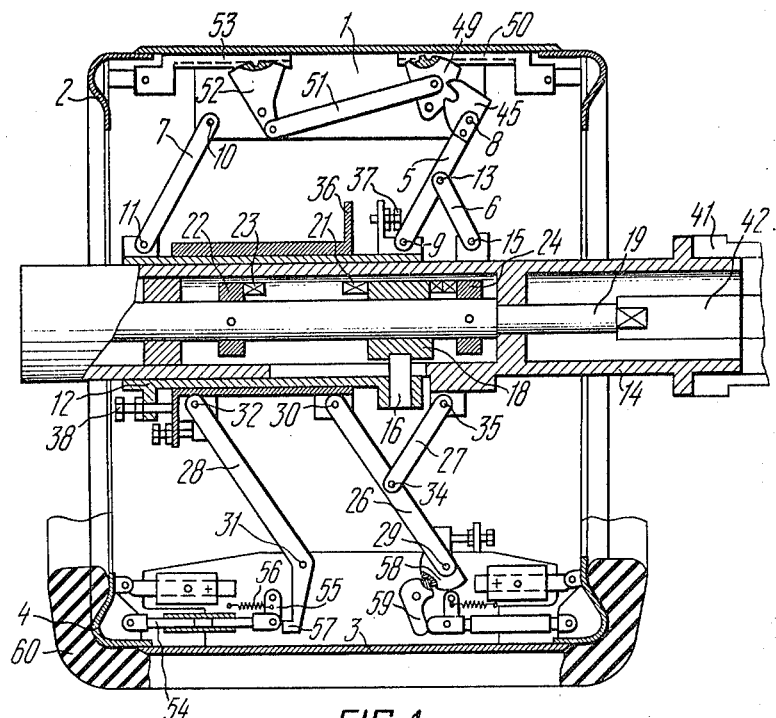

United States Patent [19]

Samokhvalov et al.

[11] 4,425,180

[45] Jan. 10, 1984

[54] TIRE CASING ASSEMBLY DRUM

[75] Inventors: Jury I. Samokhvalov; Vladimir A. Kim; Engels K. Golovkin, all of Yaroslavl, U.S.S.R.

[73] Assignee: Vsesojuzny Nauchno-Issledovatelsky I Konstruktorsky Institut Po Oborudovaniju Dlya Shinnoi Promyshlennosti, Yaroslavl, U.S.S.R.

[21] Appl. No.: 281,354

[22] Filed: Jul. 8, 1981

[51] Int. Cl.³ .................................................. B29H 17/16
[52] U.S. Cl. ....................................... 156/415; 156/418; 156/420
[58] Field of Search ................ 156/420, 417, 418, 415

[56] References Cited

U.S. PATENT DOCUMENTS 3,562,062   2/1971   Bryant .................................. 156/417
4,126,507  11/1978   Kim et al. ........................... 156/415

FOREIGN PATENT DOCUMENTS 1160059   7/1968   United Kingdom ................ 156/420

*Primary Examiner*—Michael W. Ball
*Attorney, Agent, or Firm*—Murray Schaffer

[57] ABSTRACT

The present drum can find application mainly for assembling large-size tire casings.

The drum comprises sectors with shoulders provided with a drive for their radial movement. The drive incorporates slide-blocks arranged concentrically with each other on a shaft axially movable therealong. The slide-blocks are articulated, through levers, with the sectors. The midpoint of one of the levers of each slide-block is articulated with the shaft through the link which is half as long as the lever.

The shoulders are provided with a mechanism for their relative movement with respect to the sector. The mechanism is made as a cam associated with the lever of radial movement drive of the sector. The cam is adapted to engage one of the toothed segments articulated to the sector. The toothed segments are kinematically associated with each other and are in mesh with the respective toothed racks connected to the shoulders, so that the toothed segment engages the cam through the agency of a pin provided on the cam.

The kinematic association between the toothed segments may be in fact a link articulated to the toothed segments, while the hinge joints of the link are arranged on both sides of the plane passing through the axes of rotation of the toothed segments.

According to one of the embodiments of the present invention the mechanism of movement of the shoulders relative to the sector is made as a number of links, each of which is articulated to the shoulder and to the member articulated to the sector. The levers of the drive for radial movement of the sector are provided with stops adapted to engage the links. One of the stops is made as a cam articulated to the sector and kinematically associated with the lever.

4 Claims, 5 Drawing Figures

TIRE CASING ASSEMBLY DRUM

The present invention relates generally to tire case-making equipment and more specifically to a tire casing assembly drum.

The invention can find most utility when applied to assembling large-size casings, viz, 39", 45", 49", 51", 57", and over.

As motor vehicle transport develops there are imposed more and more requirements as to load-carrying capacity of motor tire casings made use of in high-capacity wheeled motor vehicles of various applications. Tire casings for such vehicles feature a great many cord plies enwrapping the bead wires that carry a majority of load when in operation. On this account much greater technological loads are involved in the course of tire casing assembly, said loads being taken up by the assembly drum as a principal working member involved in the assembly process, as all assembly operations are carried out thereon.

It is due to further automation and mechanization of the tire casing assembly process that the tire assembly equipment should operate at higher rates and that stricter requirements are imposed on the assembly drums as to their strength, rigidity, durability, and reliability.

One prior-art tire casing assembly drum (cf., e.g., USSR Inventor's Certificate No. 187,219) is known to comprise a number of regularly alternating sectors carrying rigidly fixed shoulders and movably mounted ones. The sectors are connected to a mechanism for their movement and to cross-arms through pivotable levers. The cross-arms are arranged on the drum screw. Each of the mechanisms for sector movement comprises circular slide-blocks mounted on the screw and articulated to the sectors through levers. When collapsing the drum the sectors perform radial and axial movements.

However, such movements of the sectors during the drum collapsing might result in damage to the inner surface of an assembled tire casing. Moreover, on account of axial movement of its sectors the drum features a considerable axial size when collapsed, which adds to the overall dimensions of the entire tire-making machine.

In said drum the shoulders move throughout the drum collapsing period, whereby shoulders of a definite profile should be used which imposes limitation upon the assortment of tire casings assembled.

In addition, the pivot pins of the hinge joints of the levers are accommodated in the slots of the sectors, with the result that when the drum is being opened, the sectors get jammed in the gaps between the hinge joints and slots, which makes impossible integration of the sectors into a single rigid structure. That is why, in order to avoid movability of the sectors in an opened drum, the pivotable levers are fixed manually by a locking device, which rules out automation of the assembly and removal of tire casings.

Known in the present state of the art is a tire casing assembly drum as per USSR Inventor's Certificate No. 472,810 cl.B 29 H 17/16, 1973.

The drum comprises sectors carrying rigidly fixed shoulders and sectors provided with shoulders traversable inside the drum and having toothed racks with circular recesses, and a mechanism of traversing the sectors made as levers provided with toothed segments carrying circular projections adapted to interact with the respective circular recesses in the toothed racks, said levers being articulated to the sectors and to circular slide-blocks movable lengthwise the drum and concentrical with respect to each other and to the shaft.

This drum is disadvantageous in that provision of the sector movement mechanism made of the two symmetrically arranged trains of levers connected to the two groups of slide-blocks oppositely movable by virtue of rotation of a common motion screw and integrated into a single statically indeterminate system through the toothed segments of the levers, results due to unavoidable imperfect machining quality, in extra loads that involve deformation of component parts, higher wear of movable joints and increased axial dimensions of the drum when collapsed.

When the shoulders travel towards the centre of the drum the rack teeth get out of mesh with the toothed segments of the levers, with the result that when the shoulders travel backwards the toothed segments of the levers fail to reengage the toothed racks properly, whereby seizure occurs.

Part of the drum sectors have stationary fixed shoulders thereon, which place limitation on them as for assembly of large-size tire casings.

It is an object of the present invention to simplify the construction of a tire casing assembly drum.

It is another object of the present invention to provide higher durability and reliability of the tire casing assembly drum involved.

It is one more object of the present invention to extend the range of tire casings assembled.

Said and other objects are accomplished due to the fact that in tire casing assembly drum comprising sectors carrying shoulders and provided with a drive for their radial movement, which incorporates slide-blocks arranged concentrically with respect to each other on the shaft and axially traversable lengthwise the shaft, said slide-blocks being articulated to the sectors through levers, according to the present invention, the middle portion of each of the levers of each slide-block is articulated to one of the ends of the link, the other end of which is articulated to the shaft, and the rod length equals half the length of the slide-block lever.

The herein-proposed invention enables one to simplify the drum construction, to substantially increase its durability, reduce its axial dimensions and impart more rigidity to the entire structure. This is attained due to the fact that the mechanism of radial movement of the sectors incorporates only a single group of traversable slide-blocks, while any extra loads due to manufacturing imperfection are avoided as the mechanism is in fact a statically determinate system.

Since some of the levers are associated with the drum shaft no linkage is needed between the adjacent sectors to fix their relative position, and the travel of the slide-blocks is reduced one half as a hub-shaft is substituted for one group of slide-blocks, which is set in motion according to the present invention. This simplifies the construction of a screw drive of the slide-blocks and enables it to be replaced by any other type of drive, in particular by pneumatically, hydraulically operated, or some other.

It is expedient that one of the slide-block levers be kinematically associated with one of the toothed segments provided on the sector and kinematically associated with each other and being in mesh with the respective toothed racks, which are in turn connected to the shoulders.

A kinematic association of the slide-block lever with the toothed segment is expedient to be made as a cam provided on the lever and adapted to interact with the toothed segment.

An interaction of the cam with the toothed segment is expedient to be effected through a pin provided on the toothed segment and adapted to engage the cam contour.

With such a constructional arrangement of the shoulder traversing mechanism constant mesh of the toothed segments with the toothed racks is ensured, which rules out any possibility for said mechanism to jam.

It is expedient that the kinematic association between the toothed segments be made as a link articulated to the toothed segments, and that the hinge joints of the link be arranged on both sides of the plane passing through the axes of rotation of the toothed segments.

Such a linkage between the toothed segments may be used for drums with different-width sectors, as it does not depend on the centre distance of the toothed segments. This construction is applicable in drums for assembling tire casings sized 39" and over.

It is expedient that one of the levers be kinematically associated with a cam hinge-mounted on the sector and adapted to interact with the link end connected to the shoulder, and that the other level of the slide-block be provided with a stop adapted to get in engagement with the end of the other link connected to the other shoulder.

A kinematic association of the lever with the cam is expedient to be made through the toothed segment in engagement with the cam.

The aforesaid mechanism makes it possible, when the drum is being collapsed, to move the shoulders inwards the drum under the action of the beads of the assembled tire casing, thereby preventing any deformation of the tire beads. This reduces considerably the efforts required for the drum to collapse, as well as relieves the kinematic members and movable joints of the drum mechanisms, while a required rigidity of the open drum structures is attained.

Figure 2:
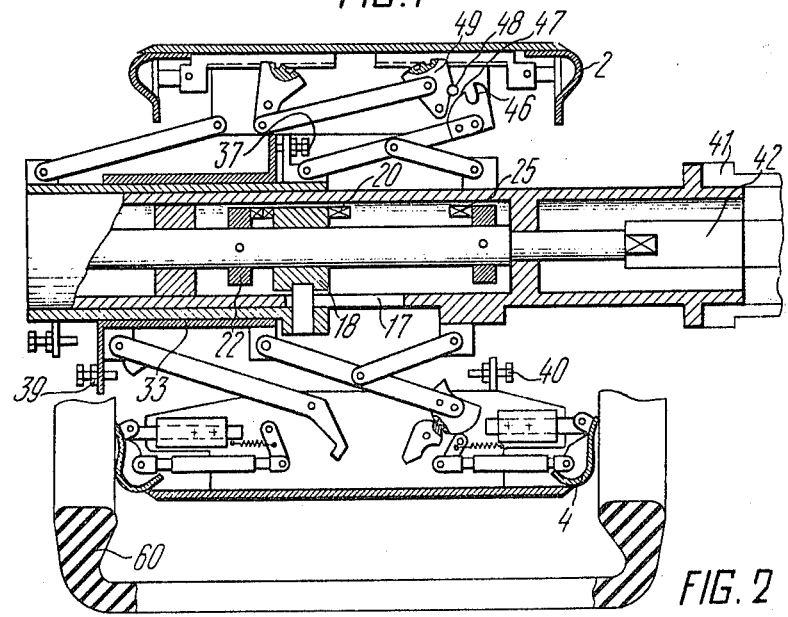
Figure 3:
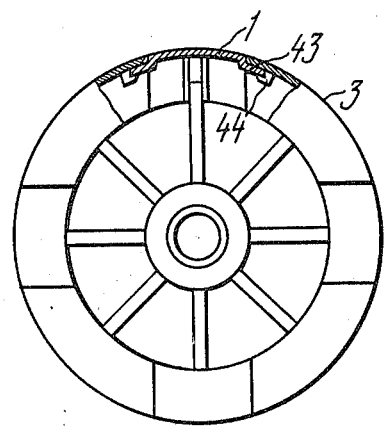
Figure 4:
Figure 5:
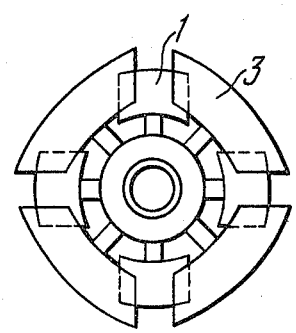

Other objects and advantageous features of the present invention will be readily understood by reference to the following detailed description of an embodiment thereof when considered in connection with the accompanying drawings, wherein:

FIG. 1 is a general view of the drum when open;
FIG. 2 is a general view of the drum when collapsed;
FIG. 3 is an end view of the drum when open;
FIG. 4 shows the arrangement of stops of sectors in an open drum; and
FIG. 5 is an end view of the drum when collapsed.

Referring now to the accompanying drawings the drum comprises sectors 1 (FIGS. 1, 2) carrying movable shoulders 2, and sectors 3 carrying movable shoulders 4.

Each of the sectors 1 has its own drive made as a lever 5, a link 6 and a lever 7. The levers 5 and 7 are connected to the sector 1 and a slide-block 12 through hinge joints 8, 9 and 10, 11, while the link 6 is connected to the middle of the lever 5 and to a shaft 14 through hinge joints 13 and 15, respectively.

The lever 5 is twice as long as the link 6.

The axes of the hinge joints 13 and 15, 9 and 13, 8 and 13 are spaced equally apart, while the axes of the hinge joints 8, 13, 9 lie on the same straight line. The lever 7 is arranged in parallel to the lever 5, while the hinge joints 10 and 11 of the lever 7 and the hinge joints 8 and 9 of the lever 5 are spaced equally apart. The slide-block 12 movably mounted on the drum shaft 14 by means of a key 16 which passes through a slot 17 of the drum shaft 14, is connected to a nut 18 of a motion screw 19. The nut 18 has stops 20 and 21, while the motion screw 19 carries a travel restraining arm 22 of the nut 18 having a stop 23, and a travel restraining arm 24 of the nut 18 having a stop 25.

The traversing drive of the sector 3 is made as a lever 26, a link 27 and a lever 28. The levers 26 and 28 are connected to the sector 3 and a slide-block 33 through hinge-joints 29, 30 and 31, 32, while the link 27 is connected to the lever 26 through a hingle joint 34 and to the shaft 14, through a hinge joint 35. The axes of the hinge joints 34 and 35, 30 and 34, 34 and 29 are spaced equally apart, while the axes of the hinge joints 29, 34 and 30 are arranged collinearly. The lever 26 is arranged in parallel to the lever 28, and the hinge joints 31, 32 of the lever 28 and the hinge joints 29, 30 of the lever 26 are spaced equally apart.

The axes of the hinge joints 9 and 15 lie on a straight line parallel to the axis of the drum shaft 14. Similarly the axes of the hinge joints 30 and 35 lie on a straight line parallel to the axis of the drum shaft 14.

The slide-block 33 has a flange 36.

The slide-block 33 is mounted movably on the slide-block 12 which has adjustable stops 37 and 38. The stop 37 gets in contact with the flange 36 when the slide-block 12 is traversing. The slide-block 33 is provided with an adjustable stop 39, while the sector 3, with an adjustable stop 40.

A hollow shaft 41 of the tire building machine whereon the drum is mounted, is connected to the drum shaft 14, and a shaft 42 of the machine is connected to the motion screw 19.

The sectors 1 (FIGS. 3 and 4) have stops 43 adapted to engage the inner surfaces of the sectors 3 when the drum is open, as well as with stops 44 of the sector 3.

A mechanical drive to impart motion to the shoulders 2 with respect to each of the sectors 1 comprises a cam 45 held in place on the lever 5 and having a cam drop 46 and a cam dwell 47. The cam 45 is adapted to engage a pin 48 provided on a toothed segment 49. However, some other versions of a kinematic association of one of the levers 5 of the slide-block 12 with one of the toothed segments 49 are possible. The toothed segment 49 is articulated to the sector 1 and is in constant mesh with a toothed rack 50 movably mounted on the sector 1 and rigidly held to the shoulder 2. However, a non-rigid association of the shoulder 2 with the toothed rack 50 may also be provided, e.g., when the shoulder 2 is articulated to the sector 1. The toothed segment 49 is articulated (through a link 51) to a toothed segment 52, which in turn is articulated to the sector 1. The segment 52 is in constant mesh with a toothed rack 53 movably mounted in the sector 1 and connected to the shoulder 2. The hinge joints of the link 51 are situated on both sides of the plane passing through the axes of rotation of the toothed segments 49 and 52, through direct engagement of the toothed segments 49 and 52 by meshing, as well as some other embodiments of a kinematic association therebetween are also possible.

The shoulders 4 of the sector 3 may be provided with the aforesaid mechanical traversing drive of the shoulders 2; such being the case, the cam 45 is locked in position on the lever 26.

Another embodiment of the mechanism of traversing the shoulders 4 with respect to the sector 3 incorporates the shoulders 4 articulated to the sector 3 and articulately connected to members 55 through variable-length links 54 (FIG. 1). The members 55 are articulated to the sector 3 and have springs 56. The lever 28 has a stop 57 adapted to engage the link 54 when the drum is open. The lever 26 carries a toothed segment 58 locked in place thereon, said segment being in engagement with a cam 59 which is articulated to the sector 3 and adapted to engage the link 54 when the drum is open. However, some other versions of a kinematic association of the lever 26 with the cam 59 are also possible.

A tire casing 60 is assembled on the drum.

The drum of the present invention operates as follows.

The tire casing 60 is assembled on an open drum mounted on the hollow shaft 41 of a machine for building tire casings 60. As the latter consists of standard layers of material, said layers are applied with the drum rotating. Bead wires of the tire casing 60 are set in the drum end portions, whereupon the materials of the tire casing 60 are wound with a high tension by the machine mechanisms.

The materials of the tire casing 60 based on crude rubber get joined together by virtue of their tacking properties and due to their being rolled up on the drum under a pressure of the rolls of the tire building machine. Just as the tire casing 60 is finished it must be removed from the drum for which the drum must be collapsed so that the diameter of an ascribed circumference of the collapsed drum should not exceed the diameter of the green tire casing 60 across its bead (i.e., the diameter at rim seat).

The drum is collapsed as follows.

The shafts 41 and 14 (FIGS. 1, 2) are slowed down, whereas the motion screw 19 receives rotation from the shaft 42 of the machine. Rotation from the motion screw 19 is imparted to the nut 18, whereby the latter together with the slide-block 12 travels lengthwise the drum axis; at the same time the levers 6, 5 and 7 while turning cause the sector 1 to move radially towards the drum axis.

The aforesaid radial movement of the sector 1 is provided by a specific feature of the mechanism made up by the link 6 articulated to the midpoint of the lever 5. With the aforesaid length ratio of the lever 5 and the link 6 the hinge joint 8 moves along a straight line passing through the fulcrums of the hinge joints 15 and 8 said straight line being perpendicular to a straight line passing through the fulcrums of the hinge joints 9 and 15 and parallel to the drum axis.

Simultaneously with the movement of the sector 1 the cam 45, while engaging the pin 48, causes the toothed segment 49 to turn and, through the agency of the link 51, does so with the toothed segment 52, both of said segments making the toothed racks 50 and 53 and the shoulders 2 traverse towards the centre of the drum. The shoulders 2 keep traversing the drum centre until the pin 48 gets engaged with the dwell 47 of the cam 45. At the end of the traversing of the shoulders 2 the adjustable stop 37 of the slide-block 12 engages the slide-block 33, whereby both slide-blocks 12 and 33 travel henceforth jointly. As a result, the levers 27, 26 and 28, while turning cause the sector 3 (like the sector 1) to travel axially towards the drum axis.

With further collapsing of the drum the sectors 1 and 3 move in synchronism. The mechanism of radial movement of the sector 3 operates similarly to the same mechanism of the sector 1. The stops 57 and 59 are disengaged from the links 54 due to turning of the respective levers 5 and 26. The shoulders 4 under the action of the bead of the tire casing 60 are turned inwards the drum relative to the sector 3.

At the end of the radial traverse of the sectors 1 and 3 the stop 21 of the nut 18 gets engaged with the stop 23 of the restraining arm 22, which prevents the nut 18 from getting engaged with the motion screw 19 and thus provides for a preset travel of the slide-block 12.

In a collapsed drum the sectors 1 and 3 assume the position as shown in FIG. 5.

The drum opening procedure occurs in a sequence reverse to the collapsing one. At the end of the drum opening procedure the stop 20 of the nut 18 gets engaged with the stop 25 of the restraining arm 24, which prevents the nut 18 from getting engaged with the motion screw 19 and provides for a preset travel of the slide-block 12. At the same time the slide-block 33 engages the adjustable stop 38 of the slide-block 12, and the levers 26 and 28, with the adjustable stops 39, and 40, respectively. The stops 43 of the sector 1 engage the inner surface of the sectors 3 and the stops 44 of the sectors 3, thereby integrating all the sectors 1 and 3 of the drum into a single rigid structure.

What we claim is:

1. A tire casing assembly drum comprising:
    a central hollow shaft; a plurality of sectors disposed about said shaft, each sector having movable shoulders on its inner surface;
    a drive system comprising a screw having unidirectional threads disposed within said shaft and inner and outer slide-blocks arranged concentrically with each other on said shaft and connected to said screw to be axially reciprocable along said shaft;
    means effecting the radial traversing of each of said sectors comprising a pair of parallel levers of equal length, each pair of levers articulately connecting one of said slide-blocks and one of said sectors and;
    a link articulately connecting the midpoint of one lever of said pair of levers to the shaft, the length of said link equalling half the length of the lever connected thereto;
    one of said levers of that pair of levers connected to the inner slide-block being provided with a contoured cam and a kinematic connection between said cam and the shoulders of the associated sector operable to traverse said shoulders relative to said sector at the beginning and end of the radial traversing of said sector.

2. The drum according to claim 1 in which the kinematic connection comprises a pair of toothed segments pivotally mounted on said sectors and kinematically linked for conjoint movement, one of said toothed segments having a pin adapted to engage said contoured cam, and a pair of racks respectively engaging one of said toothed segments and one of said shoulders.

3. The drum according to claim 2 wherein the kinematic link between said toothed segments comprise an arm articulating joined at its ends to one of said toothed segments, the hinge axis of one of said joints being arranged on one side of the plane extending through the axis of rotation of said of the toothed segments and the hinge axis of the other of said joints being arranged on the other side of said plane.

4. A tire casing assembly drum comprising:

a central hollow shaft; a plurality of sectors disposed about said shaft, each sector having movable shoulders on its inner surface;

a drive system comprising a screw having unidirectional threads disposed within said shaft and inner and outer slide-blocks arranged concentrically with each other on said shaft and connected to said screw to be axially reciprocable along said shaft;

means effecting the radial traversing of each of said sectors comprising a pair of parallel levers of equal length, each pair of levers articulately connecting one of said slide-blocks and one of said sectors and; the shoulders of that sector associated with the outer slide block being pivotably mounted on said sector and resiliently biased axially inwardly of said sector, and one of said parallel levers is provided with a movable stop at its end for moving one of the shoulders outwardly and the other of said parallel levers is provided with a toothed segment engaging with a stop member pivotably mounted on said sector or moving the other of said shoulders outwardly.

* * * * *